US 6,328,001 B1

(12) United States Patent
Kirtley et al.

(10) Patent No.: US 6,328,001 B1
(45) Date of Patent: *Dec. 11, 2001

(54) REPLACEABLE CYLINDER LINER WITH IMPROVED COOLING

(75) Inventors: Daniel E. Kirtley; Carol L. Corbeels; Andrew P. Perr, all of Columbus, IN (US); Abby J. Dawkins, San Jose, CA (US); Kristopher R. Bare, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,527

(22) Filed: Aug. 1, 2000

Related U.S. Application Data

(63) Continuation of application No. 08/897,912, filed on Jul. 21, 1997, now Pat. No. 6,116,198.

(51) Int. Cl.$^7$ ............................................. F02F 1/16
(52) U.S. Cl. .......................... 123/41.84; 123/193.3
(58) Field of Search ........................ 123/41.83, 41.84, 123/193.3, 193.2

(56) References Cited

U.S. PATENT DOCUMENTS

| 3,403,661 | 10/1968 | Valentine et al. | 123/41.84 |
|---|---|---|---|
| 3,818,878 | 6/1974 | Zaruba | 123/41.82 |
| 3,973,429 | 8/1976 | Durgan et al. | 73/49.7 |
| 4,034,723 | 7/1977 | Hamparian | 123/41.76 |
| 4,046,114 | 9/1977 | Hamparian et al. | 123/41.76 |
| 4,244,330 | 1/1981 | Baugh et al. | 123/41.84 |
| 4,305,348 | 12/1981 | Martin | 123/41.82 |
| 4,440,118 | 4/1984 | Stong et al. | 123/41.84 |
| 4,562,799 | 1/1986 | Woods et al. | 123/193.2 |
| 4,616,603 | 10/1986 | Kubis et al. | 123/41.84 |
| 4,638,769 | 1/1987 | Ballheimer | 123/41.84 |
| 4,844,030 | 7/1989 | McAvoy | 123/193.5 |
| 4,867,118 | 9/1989 | Kubis et al. | 123/193.3 |
| 5,048,468 | 9/1991 | Broughton et al. | 123/41.74 |
| 5,150,668 | 9/1992 | Bock | 123/41.8 |
| 5,251,579 | 10/1993 | Morris | 123/41.84 |
| 5,299,538 | 4/1994 | Kennedy | 123/41.79 |
| 5,343,837 | 9/1994 | Ward et al. | 123/193.5 |
| 5,575,251 | 11/1996 | Bock | 123/193.3 |
| 5,752,480 | 5/1998 | Berggren et al. | 123/193.3 |

FOREIGN PATENT DOCUMENTS

| 0 768 459 A1 | 4/1997 | (EP) . |
|---|---|---|
| 2 164 702 | 3/1986 | (GB) . |
| 2 250 058 | 5/1992 | (GB) . |
| 50-147008 | 5/1974 | (JP) . |
| 58-181951 | 5/1982 | (JP) . |
| 61-17157 | 7/1984 | (JP) . |
| 61-17158 | 7/1984 | (JP) . |
| 63-31237 | 8/1986 | (JP) . |
| 62-69275 | 3/1987 | (JP) . |
| 7-253043 | 3/1994 | (JP) . |

*Primary Examiner*—Noah P. Kamen
(74) *Attorney, Agent, or Firm*—Woodard, Emhardt, Naughton, Moriarty & McNett

(57) ABSTRACT

A replaceable cylinder liner for an internal combustion engine. The position of the liner within the block is established by a midstop. An interference fit below the midstop seals the bottom end of a cooling passage that extends around the liner. The top end of the cooling passage is sealed by an o-ring, and when the engine is warmed up by an interference fit also. The top of the cooling passage is close to the top dead center position of the top piston ring, and reduces the temperature of the top piston ring.

25 Claims, 3 Drawing Sheets

REPLACEABLE CYLINDER LINER WITH IMPROVED COOLING

This application is a continuation of and claims priority to U.S. patent application Ser. No. 08/897,912, filed Jul. 21, 1997, which issued as U.S. Pat. No. 6,116,198.

BACKGROUND OF THE INVENTION

This invention relates to replaceable cylinder liners for internal combustion engines, including very efficient diesel engines with high brake mean effective pressures. However, certain applications for the present invention may be outside of this field.

Replaceable cylinder liners provide significant advantages to internal combustion engines, especially those engines intended to have extremely long periods of time between overhauls. Engines such as truck diesel engines may be designed for two million hours of usage between overhauls. At the time of overhaul, the cylinder liners of such engines can be removed and replaced and the engine block reused with another set of liners. Further, at the time of manufacturing, replaceable liners eliminate the need for precision finishing of long bores in a block, shifting that process to a smaller, more economical operation on an individual liner.

The continuing need for more thermally efficient engines has placed additional demands on the cylinder liner. Increased thermal efficiency can be achieved by increasing the brake mean effective pressure (BMEP) of the engine. Advanced diesel engines are capable of BMEP in excess of 300 psi. These very efficient engines have very high combustion temperatures. A portion of the combustion energy not converted into work or expelled as exhaust gas must be dissipated, and a portion of this energy is dissipated as heat conducted through the walls of the cylinder liner and into the cooling system. If this heat is not properly removed from the cylinder liner, there can be numerous problems. One such problem involves overheating of the top piston ring.

Unlike the bottom piston ring and the piston itself, the top piston ring receives only limited cooling from the engine oil supply. Unlike the bottom ring, the top piston ring is directly exposed to combustion gases. If the top piston ring overheats, oil in contact with the ring from the cylinder wall inner diameter will be converted to coke, with an accompanying loss of lubrication. Ring and liner wear will be accelerated as a result, and ring failure made more likely.

One method of removing heat from the top piston ring involves improved cooling of the cylinder liner. A cooler cylinder liner will conduct more heat away from the top piston ring. Various ideas have been proposed for improved cooling of replaceable cylinder liners. These ideas, as well as ideas generally relating to cylinder liners, can be found in the following U.S. Patents:

| Patent No. | Patentee | Issue Date |
|---|---|---|
| 4,244,330 | Baugh et al. | 1/13/81 |
| 4,305,348 | Martin | 12/15/81 |
| 4,616,603 | Kubis et al. | 10/14/86 |
| 4,638,769 | Ballheimer | 1/27/87 |
| 4,867,118 | Kubis et al. | 9/19/89 |
| 5,048,468 | Broughton et al. | 9/17/91 |
| 5,150,668 | Bock | 9/29/92 |
| 5,299,538 | Kennedy | 4/5/94 |

-continued

| Patent No. | Patentee | Issue Date |
|---|---|---|
| 5,343,837 | Ward et al. | 9/6/94 |
| 5,575,251 | Bock | 11/19/96 |

There is a continuing need for improved cooling of cylinder liners. The present invention provides a novel and unobvious apparatus and method for improved cooling of cylinder liners.

SUMMARY OF THE INVENTION

One aspect of the present invention provides a replaceable cylinder liner for an internal combustion engine with a cylinder head and an engine block. The cylinder liner includes a rim section of the liner proximate the cylinder head, a circumferential seal groove defined within the rim section, a seal ring located within the groove, and a mid stop of the liner below the groove.

Another aspect of the present invention provides a method for locating and sealing a replaceable cylinder liner within an engine block of an internal combustion engine. The method includes receiving a replaceable cylinder liner within an engine block, locating the axial position of the cylinder liner within the engine block by a mid stop, flowing coolant in a cooling passage between the liner and the block, and sealing the bottom of the cooling passage with a diametral interference fit between the cylinder liner and the engine block.

One object of the present invention is to provide an improved replaceable cylinder liner for an internal combustion engine.

Related objects of the present invention will be apparent from the description of the preferred embodiment.

DESCRIPTION OF THE PREFERRED EMBODIMENT

Figure 1:
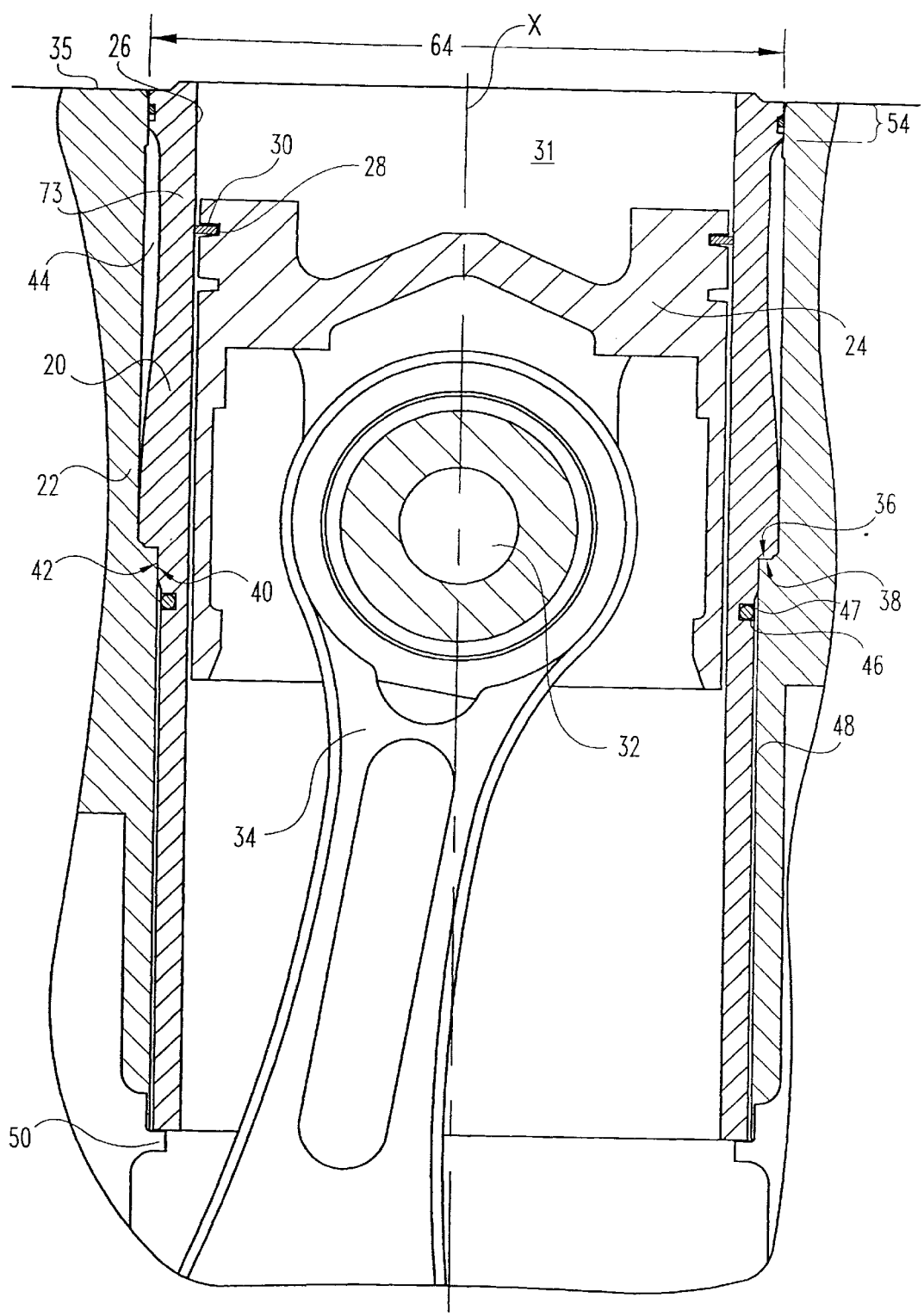
FIG. 1 is a front elevational, cross sectional illustration of the preferred embodiment of the present invention, showing a replaceable cylinder liner within an engine block.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
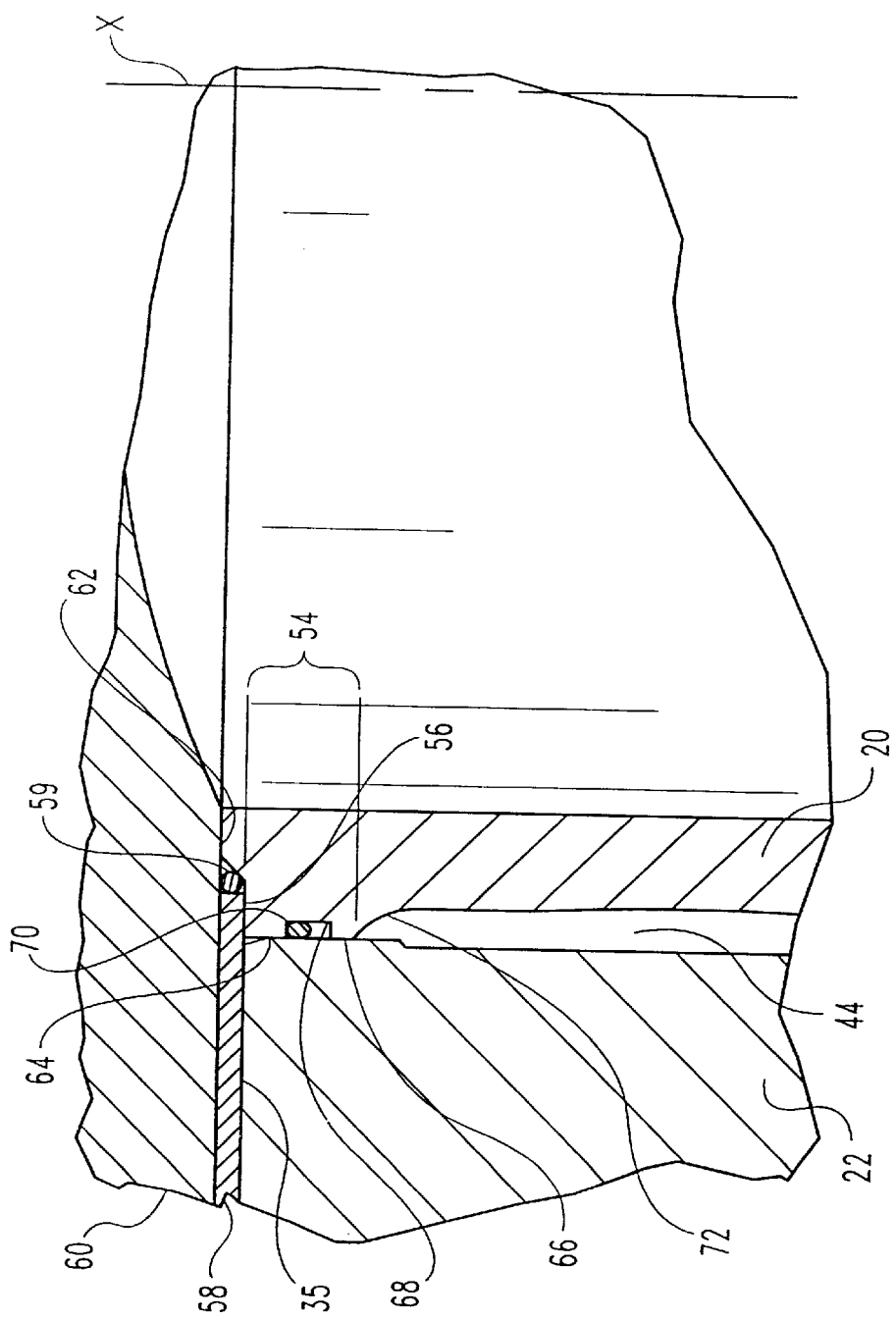
FIG. 2 is a partial, enlarged front elevational view of a portion of the FIG. 1 liner without a piston, but including a head gasket, fire ring, and cylinder head.
Figure 3:
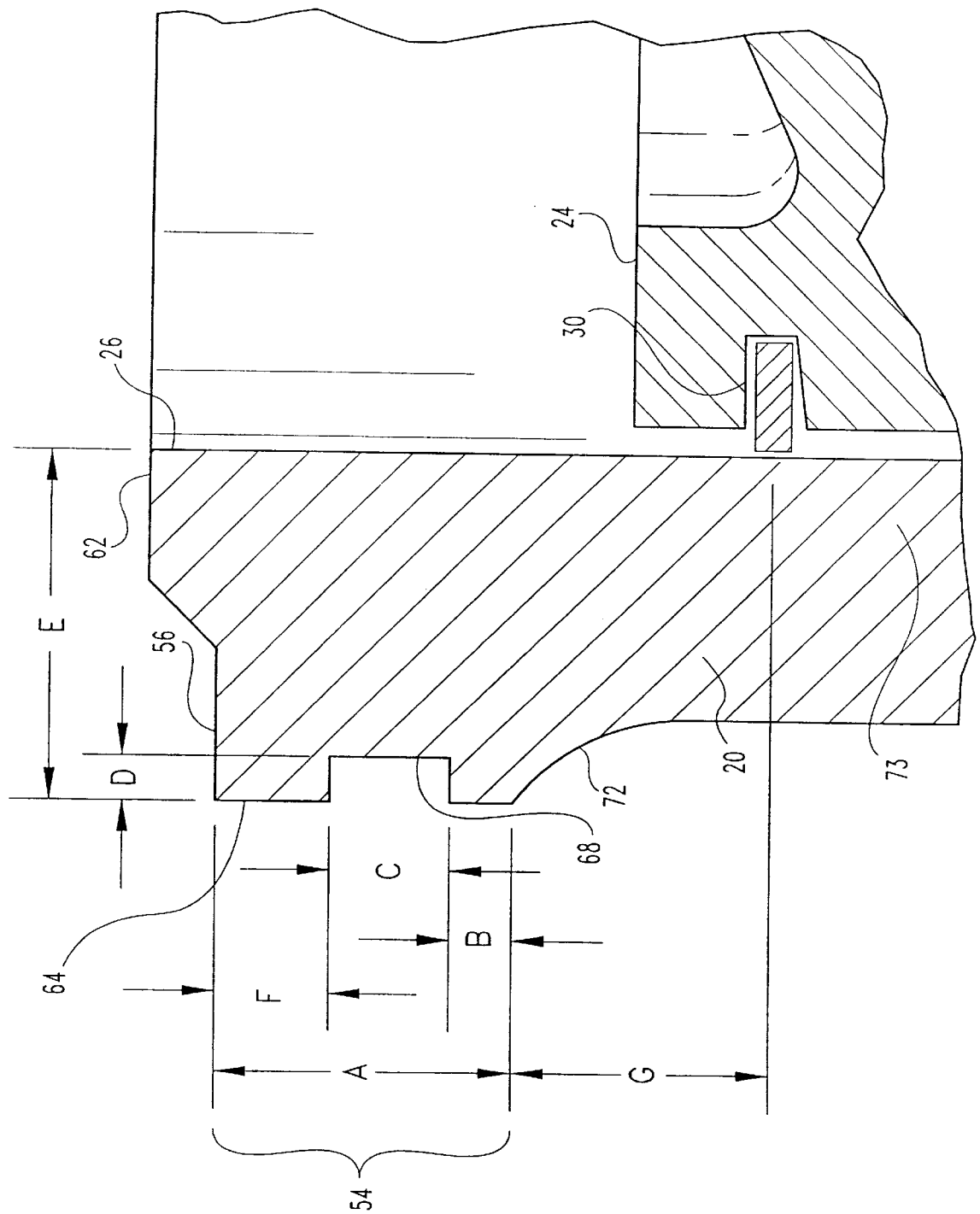
FIG. 3 is a partial, front elevational view of a portion of the liner of FIG. 1 in the vicinity of the rim section.

The preferred embodiment of the present invention is shown in FIGS. 1–3. FIG. 1 is a cross-sectional view showing cast replaceable cylinder liner 20 as received within engine block 22. The present invention is useful with diesel engines of very high combustion temperatures of the variety having brake mean effective pressures (BMEP) in excess of 300 psi. The present invention is also useful generally in any internal combustion engine with replaceable cylinder liners. Liner 20 is typically cast with subsequent machining of certain sliding, contact, and sealing surfaces, although the present invention contemplates other methods of fabrication as well.

A piston 24 is slidably received within piston sliding diameter 26 of liner 20. Top piston ring 28 located within top ring groove 30 contacts diameter 26, and provides a lower seal for combustion chamber 31. Wrist pin 32 rotatably connects piston 24 to connecting rod 34. Rod 34 is connected to a crankshaft in a conventional manner.

Liner 20 is slidably inserted within block 22 from top surface 35 of block 22, surface 35 also being called the fire deck of block 22. Liner 20 is inserted until liner midstop 36 contacts block ledge 38. Midstop 36 is at a position intermediate the top and bottom surfaces of liner 20, midway along centerline axis X. Midstop 36 establishes the axial position of liner 20 within block 22. Located proximate to midstop 36 is interference inner diameter 42 of block 22 and interference outer diameter 40 of liner 20. Inner diameter 42 is about 0.15 to 0.25 millimeters (0.006–0.010 inches) smaller than outer diameter 40. As liner 20 is inserted within block 22, force must be applied to liner 20 to overcome the interference fit designed between inner diameter 42 and outer diameter 40. As the force is applied generally about centerline X of liner 20, liner 20 slides within block 22 until midstop 36 contacts ledge 38.

The interference fit of diameter 40 within diameter 42 seals the bottom portion of a coolant passage 44 between liner 20 and block 22 that extends around liner 20. This interference fit results in a leak-tight seal. It is not necessary to use a settable plastic material on or near diameters 40 and 42 to provide a seal. A redundant seal is accomplished with o-ring 46 inserted within groove 47 just below the interference fit, the term below indicating in the direction of the crankshaft. Extending beneath O-ring 46 is clearance annulus 48 between the bottom of liner 20 and the bottom of block 22. This clearance annulus extends along the bottom length of liner 20 to the bottom of liner 20 proximate bottom shelf 50 of block 22. Shelf 50 is useful in preventing cracked portions of liner 20 from dropping within the engine crankcase. Annulus 48 may contain oil or oil mist helping to cool the bottom portion of liner 20.

Located axially near the top of liner 20 is a rim section 54. Rim section 54 is a thick-walled section that provides strength and stability to the top portion of liner 20. As liner 20 is installed in block 22 and midstop 36 contacts ledge 38, top surface 56 (see FIG. 2) of rim section 54 becomes approximately flush with top surface 35 of block 22. Top surfaces 35 and 56 are referred to as the fire deck and are proximate cylinder head 60. Cylinder head 60 is attached to block 22 by bolts (not shown). Head 60 pushes against liner 20 at contact surface 62, clamping liner 20 in axial compression between surface 62 and midstop 36. Both top surfaces 56 and 35 are in contact with head gasket 58. Head gasket 58 is held in place between top surfaces 56 and 35 and cylinder head 60. A fire deck seal ring 59 which is located between head 60 and surface 56 provides a high temperature seal around liner 20.

Thick-walled section 54 includes first outer diameter 64 which is contained within first inner diameter 66 of block 22 when liner 20 is installed in block 22. There may be a clearance fit of approximately 0.001 inch diametral clearance between outer diameter 64 and first inner diameter 66. It is also acceptable but not necessary that under some circumstances there is a light interference fit of 0.025 to 0.05 millimeters (0.001 to 0.002 inches) between diameters 64 and 66. For example, production tolerances may be such that some fits of diameters 64 and 66 are clearance fits, and others fits are interference fits.

Because of the possibility of a clearance fit between first inner diameter 66 and first outer diameter 64, a circumferential seal groove 68 is located within thick-walled section 54. Located within groove 68 is elastomeric sealing ring 70, which provides a seal from the fire deck at top surface 35 and 56 to coolant passage 44. O-ring 70 functions as a primary seal when the engine is cold. As the engine is operated and liner 20 and block 22 become hotter, clearance between first outer diameter 64 and first inner diameter 66 is lost, and diameter 64 becomes an interference fit within diameter 66. As diameters 66 and 64 come into contact, a seal between cooling passage 44 and head gasket 58 is formed.

O-ring 70 functions as a redundant seal when the engine is warmed up. Although seal ring 70 is elastomeric in the preferred embodiment, other materials known in the art may be substituted.

The thickness of rim section 54 reduces from the first outer diameter 64 through a transition section 72 to a thinner, constant thickness wall section 73 of liner 20. Transition section 72 includes a boundary of coolant passage 44, with coolant flowing between section 72 and block 22. It is preferable that section 72 smoothly transition from wall section 73 toward engine block 22. Abrupt changes in the geometry of section 72 could result in a portion of cooling passage 44 being filled with vapor in the vicinity of section 72 with subsequent reduction in cooling, or could result in cavitation within passage 44 in the vicinity of section 72 with subsequent pitting damage to liner 20 or block 22.

Because of the geometry of cooling passage and the entry point for coolant flow, the portion of cooling passage 44 proximate to transition section 72 may contain circulating pockets of coolant vapor rather than liquid phase coolant. Coolant flows through coolant passage 44 and maintains acceptable temperatures for liner 20, block 22, piston ring 28, o-ring 70, head gasket 58, fire deck seal 59, and cylinder head 60, as well as for other components. Coolant in passage 44 flows in a direction approximately perpendicular to the centerline axis X of liner 20.

Approximate dimensions for some aspects of the present invention (see FIG. 3) are given in Table 1.

TABLE 1

| Dimension | Minimum millimeters | Maximum millimeters |
| --- | --- | --- |
| A | 10 | 14 |
| B | 1.6 | 5.5 |
| C | 4.3 | 4.5 |
| D | 2.0 | 2.2 |
| E | 23 | 24 |
| F | 3.6 | 4.4 |
| G | 7.5 | 9.5 |

The present invention includes the discovery of a relationship between the dimensions of the rim section of liner 20 and the temperature of top piston ring 28. It has been found that a five millimeter reduction in dimension A results in a reduction of about 50 degrees F. in the temperature of liner 20 adjacent the location of the top dead center position of piston ring 28. As dimension A is reduced, the top of coolant passage 44, which is defined by transition section 72, moves closer to fire decks 35 and 58 and also to the top dead center position of top piston ring 28. Coolant passage 44 becomes more efficient at removing heat from fire deck 35 and 58 and ring 28.

The 50 degree F. reduction is important in maintaining an acceptable ring temperature at piston reversal or top dead center, the position at which piston 24 stops moving upward and begins moving downward. As diesel engines are designed for increased levels of thermal efficiency and brake mean effective pressure (BMEP), ring temperature at this position increases. It is preferrable to maintain top ring temperature below about 350 degrees F. At about this temperature, oil on ring 28 will decompose into coke, resulting in decreased lubrication to sliding diameter 26 and increased wear of both diameter 26 and ring 28. The present invention is especially useful in diesel engines with BMEP in excess of 300 psi.

Decreasing dimension A and raising transition section 72 toward ring 28 and fire deck 56 also results in the additional benefits of lower temperatures for O-ring 70 and head gasket 58. A five millimeter reduction in the height of thick-walled section 54 reduces the temperature of gasket 58 in the vicinity of liner 20 by about 30 degrees F., and reduces the temperature of seal ring 70 by about 19 degrees F. As a result of these lower temperatures, it is possible for gasket 58 and seal ring 70 to be constructed from conventional materials with subsequent cost savings. In the preferred embodiment, O-ring 70 is fabricated from an ethylene copolymer elastomer and has a cross sectional diameter of about 2.6 millimeters.

The present invention provides increased cooling to various components of the engine without the need for additional cooling spacer decks or spacer plates between head 60 and block 22. Also, there is no need for additional cooling sleeves between liner 20 and block 22. Such cooling sleeves may create small passages which can become plugged with debris. Cooling sleeves or spacer decks or plates may also require additional sealing features, such as o-rings and gaskets, to seal additional liner and block interfaces.

Yet another benefit of raising transition section 72 toward ring 28 and fire deck 35 is that the axial length of cooling passage 44, from section 72 to midstop 36, may also be reduced. A reduction in the length of passage 44 results in an overall lighter and more compact cooling system, a simpler design of block 22, and a lighter liner 20.

In the preferred embodiment, dimension A is preferably larger than about ten millimeters and dimension B is preferably larger than about 1.6 millimeters. Piston sliding diameter 26 of liner 20 is about 137 millimeters. First outer diameter 64 of liner 20 is about 161 millimeters. Dimension E is preferably larger than about 23 millimeters. The aspect ratio of dimension A divided by dimension E ranges from about 0.4 to 0.61. Dimension G is the distance from the top of cooling passage 44 to the center of ring groove 30 when piston 24 is at the top dead center position, and is preferably about 8 to 9 millimeters.

The dimensions of Table 1 are useful for a range of piston sliding diameters 26 from about 125 millimeters to about 150 millimeters. Beyond that range, the dimensions of Table 1 would be scaled with diameter 26 in a manner known to those of ordinary skill in the art. In this way the present invention maintains adequate strength from combustion pressure loads, resistance to waviness from clamping loads, and long term stability for rim section 54, especially as applied to advanced, high efficiency, high performance diesel engines that use a cylinder liner for about one million miles.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    an internal combustion engine including a cylinder head and an engine block;
    a replaceable cylinder liner received within said engine block;
    a rim section of said cylinder liner proximate said cylinder head; and
    a midstop of said liner below said groove;
        wherein said cylinder liner has a first interference diametral fit within said engine block proximate to said midstop, said rim section has an outer diameter, said engine block has an inner diameter, and said outer diameter is configured and arranged to be a clearance fit within said inner diameter before said engine is operated and when said engine is cold and a second interference fit within said inner diameter after said engine is operated and when said engine is hot.

2. The apparatus of claim 1 which further comprises a circumferential seal groove within said rim section and an elastomeric seal ring within said groove, said seal ring contacting said engine block.

3. The apparatus of claim 2 wherein said internal combustion engine is a diesel engine with a brake mean effective pressure greater than 300 psi.

4. The apparatus of claim 1 which further comprises a cooling passage surrounding a portion of said cylinder liner, wherein the interference diametral fit seals said cooling passage.

5. The apparatus of claim 1 wherein said engine includes a crankcase, said cylinder liner has a bottom end opposite of said rim section, the bottom end having an outer diameter, said engine block includes a shelf spaced apart and spaced below the bottom end of said cylinder liner, said shelf having an inner diameter less than the outer diameter of the bottom end, said shelf being configured and arranged to prevent portions of said liner from dropping within said crankcase.

6. The apparatus of claim 1 wherein said cylinder liner includes a contact surface in contact with said cylinder head, said cylinder head clamping said cylinder liner in compression between said contact surface and said midstop.

7. An apparatus comprising:
    an internal combustion engine including a cylinder head and an engine block;
    a replaceable cylinder liner received within said engine block;
    a rim section of said cylinder liner proximate said cylinder head; and
    a midstop of said cylinder liner below said groove;
        wherein said cylinder liner has an interference diametral fit within said engine block proximate to said midstop, said engine includes a crankcase, said cylinder liner has a bottom end opposite of said rim section, said engine block includes a shelf spaced apart and spaced below the bottom end of said cylinder liner, said shelf being configured and arranged to prevent portions of said cylinder liner from dropping within said crankcase.

8. The apparatus of claim 7 which further comprises a circumferential seal groove within said rim section and an elastomeric seal ring within said groove, said seal ring contacting said engine block.

9. The apparatus of claim 7 which further comprises a fire deck of said cylinder liner and an axis of said cylinder liner, wherein said rim section extends for an axial length of less the 12 millimeters from said firedeck.

10. The apparatus of claim 9 wherein said internal combustion engine is a diesel engine with a brake mean effective pressure greater than 300 psi.

11. The apparatus of claim 7 wherein said rim section includes a top surface, and which further comprises a seal ring located between said top surface and said cylinder head.

12. An apparatus, comprising:
an internal combustion engine including a cylinder head and an engine block;
a replaceable cylinder liner received within said engine block, said cylinder liner including a contact surface in contact with said cylinder head;
a cooling passage surrounding a portion of said cylinder liner; and
a midstop for said cylinder liner below said cooling passage, said midstop being in a diametral interference fit within said engine block, said cylinder head clamping said cylinder liner in compression between said contact surface and said midstop;
wherein the interference fit seals said cooling passage proximate said midstop, said engine includes a crankcase, said cylinder liner has a bottom end opposite of said contact surface, and said engine block includes a shelf spaced apart and spaced below the bottom end of said cylinder liner, said shelf being configured and arranged to prevent portions of said liner from dropping within said crankcase.

13. The apparatus of claim 12 which further comprises an elastomeric sealing ring assembled into a groove defined in said cylinder liner between said contact surface and said cooling passage.

14. The apparatus of claim 12 wherein said engine block includes a fire deck proximate said cylinder head and which further comprises a seal ring located between said fire deck and said cylinder head.

15. The apparatus of claim 14 wherein said internal combustion engine is a diesel engine with a brake mean effective pressure greater than 300 psi.

16. An apparatus, comprising:
an internal combustion engine including a cylinder head and an engine block;
a replaceable cylinder liner received within said engine block;
a cooling passage surrounding a portion of said cylinder liner; and
a midstop below said cooling passage, a portion of said cylinder liner proximate said midstop being in a first diametral interference fit within said engine block;
wherein the first diametral interference fit seals said cooling passage proximate said midstop, said cylinder liner includes a rim section proximate said cylinder head, said rim section has an outer diameter, said engine block has an inner diameter, and said outer diameter is configured and arranged to be a clearance fit within said inner diameter when said engine is cold and a second interference fit within said inner diameter when said engine is hot.

17. The apparatus of claim 16 which further comprises a fire deck of said cylinder liner proximate said cylinder head wherein said cooling passage is less than 12 millimeters from said fire deck.

18. The apparatus of claim 17 which further comprises an elastomeric sealing ring assembled into a groove defined in said cylinder liner between said fire deck and said cooling passage.

19. The apparatus of claim 18 wherein said internal combustion engine is a diesel engine with a brake mean effective pressure greater than 300 psi.

20. A method for retaining a replaceable cylinder liner within an engine block of an internal combustion engine, said method comprising:
receiving a replaceable cylinder liner having a rim section within an engine block;
establishing the axial position of the cylinder liner within the engine block by a midstop;
flowing coolant in a cooling passage between the liner and the block;
sealing the bottom of the cooling passage with a first interference fit between the cylinder liner and the engine block proximate the midstop; and
sealing the top of the cooling passage with a second interference between the rim section and the engine block when the engine is hot, and having a clearance fit between the rim section and the engine block when the engine is cold.

21. The method of claim 20 which further comprises sealing below the diametral interference fit with an elastomeric o-ring.

22. The method of claim 20 which further comprises providing a cylinder head and clamping the cylinder liner in compression between the cylinder head and the midstop.

23. A method for retaining a replaceable cylinder liner within an engine block of an internal combustion engine, said method comprising:
providing an engine, a replaceable cylinder liner, and an engine block having a bore and a shelf at the bottom of the bore;
receiving the replaceable cylinder liner within the engine block and above the shelf;
establishing the axial position of the cylinder liner within the bore by a midstop;
flowing coolant in a cooling passage between the liner and the block;
sealing the bottom of the cooling passage with a diametral interference fit between the cylinder liner and the engine block proximate the midstop; and
configuring the shelf to prevent portions of the liner from dropping within the block.

24. The method of claim 23 which further comprises sealing the top of the cooling passage with a sealing ring when the engine is cold and sealing the top of the cooling passage with an interference fit between the cylinder liner and the engine block when the engine is hot.

25. The method of claim 23 which further comprises sealing below the diametral interference fit with an elastomeric o-ring.

* * * * *